Sept. 5, 1961   L. S. ARNOLD, JR   2,998,901
STORAGE AND DISPENSING DEVICE FOR REFRIGERATORS
Filed Oct. 5, 1959
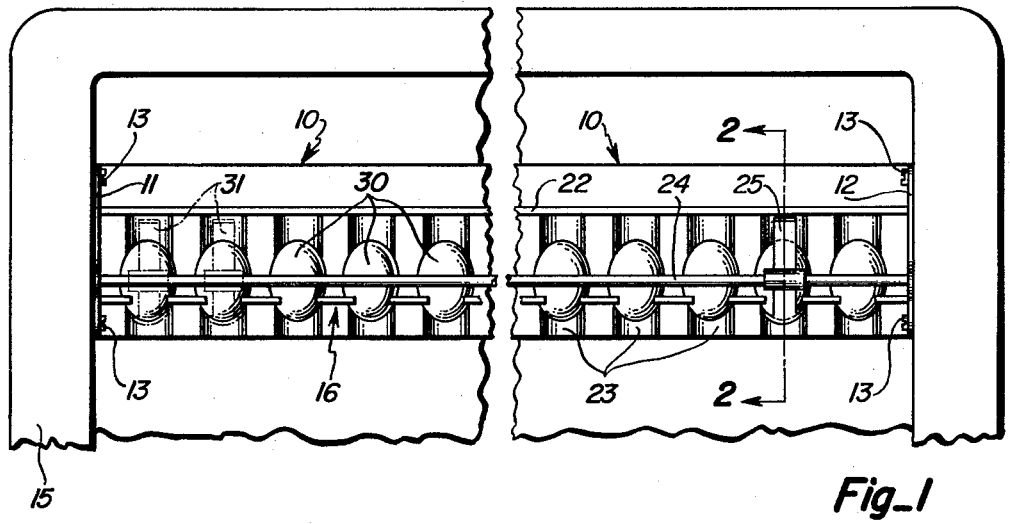
Fig_1
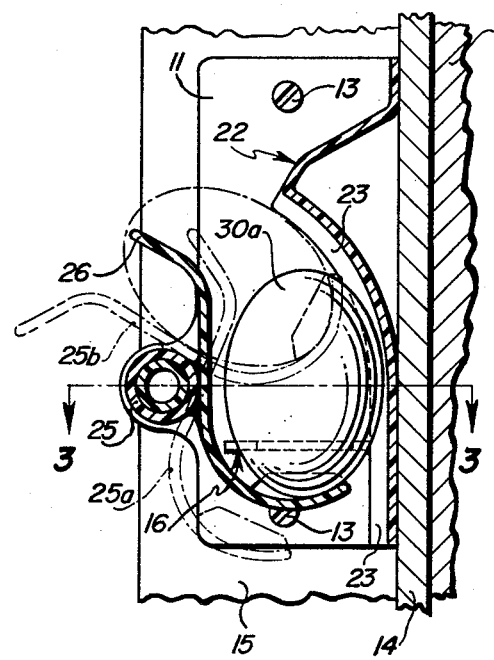
Fig_2
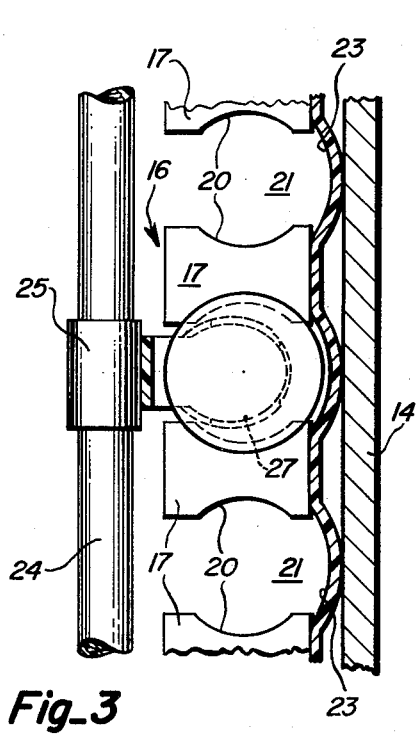
Fig_3
INVENTOR
LLOYD S. ARNOLD JR.
BY  *Albert W. Scribner*
ATTORNEY

United States Patent Office 2,998,901
Patented Sept. 5, 1961

2,998,901
STORAGE AND DISPENSING DEVICE FOR REFRIGERATORS
Lloyd S. Arnold, Jr., W. Main St., Chester, Conn.
Filed Oct. 5, 1959, Ser. No. 844,334
3 Claims. (Cl. 221—88)

This invention relates to an improved storage and dispensing means and more particularly relates to a novel food article storage and dispensing apparatus for use in household refrigerators.

Most prior proposals for the storage and dispensing of food articles in refrigerators have not been entirely satisfactory either because they have been too expensive to construct or because they have been relatively inefficient in operation. In the latter case for example, difficulty may be encountered in inserting the food articles into the storage means even though the subsequent sequential withdrawal or dispensing thereof is realtively easy. Conversely, loading of the storage means may be relatively easy yet the subsequent dispensing operations may be cumbersome or rough whereby damage to the food articles involved may occur.

One object of the instant invention is to provide a simple and inexpensive food article storage and dispensing device which will not damage the said food during loading, storage and/or dispensing operations.

Another object of the invention is to provide an efficient storage and dispensing apparatus for use in household refrigerators whereby a plurality of food articles are retained in spaced relation and whereby a single dispensing unit is adapted to be bodily moved into selective registry with said spaced articles and to be thereafter operated to withdraw and dispense the said food articles from their respective stored positions.

Another object of the invention is to provide a reliable food article storage and dispensing device for use in combination with a refrigerator whereby a plurality of individual food articles are stored in predetermined spaced relation and whereby a separate dispensing unit is provided for each food article stored.

Still another object of the invention is to provide a novel food article storage and dispensing device for refrigerators whereby said device may be fixedly or detachably secured to any convenient portion of the refrigerator.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a front elevational view of the instant apparatus.

FIGURE 2 is a fragmentary side elevational view taken along section line 2—2 of FIGURE 1.

FIGURE 3 is a fragmentary plan view in partial section taken along section line 3—3 of FIGURE 2.

The instant apparatus will be shown and described in connection with the storage and dispensing of eggs, however it will be understood that other articles such as lemons, small jars, etc. may be handled by the arrangement disclosed.

Referring to FIGURES 1–3 there is shown an elongated bracket or frame 10 having forwardly extending bent-off ears 11 and 12 which are secured as by screws 13 to the recessed inner wall 14 of the refrigerator door 15. Mounted along the length of said bracket 10 is an egg supporting rack means 16 comprising a plurality of members 17 having sides which are arcuately notched as at 20 so as to define a series of laterally spaced open sided circular type egg receiving apertures 21. The lower rearward portion 22 of the bracket 10 is formed with a plurality of egg conducting grooves or channels 23 which arcuately extend upwardly and forwardly from the rearward sides of the eggs that are respectively seated in said apertures 21. As will be apparent from FIG. 2, when in their normal seated positions the eggs are laterally stabilized by the walls of the respectively associated grooves 23. A horizontally disposed shaft 24, the ends of which are secured to the bracket ears 11 and 12 by any suitable means, supports an egg dispensing lever 25 which has an upper bent-off handle 26 and a curved lower cupped portion 27, said lever being adapted to pivot about the axis of said shaft and to slide longitudinally thereof into selective registry with said apertures.

The eggs 30 to be stored are initially seated in and thereafter retained by the respective apertures 21 defined by said rack means. In that the egg dispensing lever 25 gravitates to a normal position 25a, FIGURE 2, in which the lower cupped portion 27 thereof lies completely below all of the stored eggs, said lever may be bodily moved axially of shaft 24 into sequential registry with those eggs to be dispensed. After having been laterally moved and properly registered with any one particular egg, such as 30a of FIGURE 2, the lever may be pivotally displaced in a counterclockwise direction to a dispensing position 25b by pressing downwardly on the lever handle 26 with the back of the fingers. This action, which occurs in a plane that is substantially normal to the axis of shaft 24, will cause the lever cupped portion 27 to engage the lower end of the egg and to arcuately lift the latter out into the hand of the operator. During its upward movement the egg will be laterally guided or stabilized by the adjacent walls of the related bracket groove 23. In similar fashion each of the other eggs 30 may be successively removed from rack means 16 with ease and with a minimum amount of mechanical manipulation.

If desired several additional dispensing levers 31, FIGURE 1, similar to lever 25 may be provided in order to reduce the maximum lateral distance through which any one of said levers need be moved. Here the number of levers and apertures may be made the same. The instant apparatus, which is preferably constructed of a plastic material, may be "built into" the refrigerator or may be constructed as an attachment therefor as shown and described.

While several embodiments of the invention have been shown and described, it will be apparent to those skilled in the art that numerous variations and modifications may be made in the particular construction without departing from the underlying principles of the invention. It is therefore desired, by the following claims, to include within the scope of the invention all such variations and modifications whereby substantially the results of the invention may be obtained by the use of substantially the same or equivalent means.

The invention claimed is:

1. In combination with a refrigerator, an egg storage and dispensing device; comprising a frame secured to the inner wall of the door of said refrigerator, an egg supporting rack means secured to said frame, said rack means being formed so as to provide a plurality of laterally spaced open sided circular type apretures in which the eggs to be stored are respectively normally seated, a shaft mounted on said frame and being horizontally disposed adjacent the open sides of said apertures, a dispensing lever mounted on said shaft for pivotal movement about the axis on said shaft and for bodily movement longitudinally of said shaft, said lever having a bent off handle at the upper end thereof and a cupped egg engaging portion formed at the lower end thereof, the lower cupped lever portion normally gravitating to a position below the lower ends of the eggs seated in the apertures of said rack means so as to thereby permit said lever to be bodily moved along said shaft and to be selectively positioned in registry with a desired one of said apertures and its associated egg, said lever further being constructed and arranged so that upon downward pivotal displacement of the lever handle the said lower cupped portion of the selectively positioned lever will swing upwardly to engage and lift the desired egg out of its normal seated position and will thereafter pass through the associated open sided aperture in said rack means to a dispensing position wherein said desired egg is free to be moved into the hand of the lever operator, and a plurality of individual guide grooves formed in said frame and which respectively arcuately extend upwardly and forwardly from the rearward sides of the eggs respectively seated in said apertures, each of said guide grooves being shaped and located so as to laterally stabilize its associated egg when said egg is normally seated in its aperture and also when said egg is being lifted through a dispensing stroke by the pivotal movement of said lever.

2. In combination with a refrigerator, an egg storage and dispensing device; comprising a frame secured to the inner side of the door of said refrigerator, an egg supporting rack means mounted on said frame, said rack means being formed with a plurality of circular type open sided apertures in which the eggs to be stored are respectively received and normally seated, a shaft mounted on said frame, a dispensing lever mounted on said shaft for bodily movement axially of said shaft so as to sequentially laterally move into registry with said open sided circular type apertures and also for pivotal movement about the axis of said shaft whereby the lower end of said lever swings upwardly through a registering aperture so as to engage, lift and dispense just that egg which was seated in said registering aprture, and a plurality of individual guide channels respectively formed on said frame adjacent said apertures and along which said eggs are respectively arcuately conducted in response to the pivotal dispensing movement of said lever.

3. The combination as defined by claim 2 wherein a separate one of said dispensing levers is provided for each one of the apertures in said rack means.

References Cited in the file of this patent

UNITED STATES PATENTS

| | | |
|---|---|---|
| 2,310,072 | Fry | Feb. 2, 1943 |
| 2,587,225 | Rossi | Feb. 26, 1952 |
| 2,667,758 | Tenney et al. | Feb. 2, 1954 |
| 2,761,289 | Saunders | Sept. 4, 1956 |

FOREIGN PATENTS

| | | |
|---|---|---|
| 115,947 | Great Britain | May 30, 1918 |
| 733,009 | France | June 28, 1932 |